United States Patent
Johnson

(10) Patent No.: US 6,996,552 B2
(45) Date of Patent: Feb. 7, 2006

(54) APPARATUS AND METHOD FOR HANDLING LOGICAL AND NUMERICAL UNCERTAINTY UTILIZING NOVEL UNDERLYING PRECEPTS

(76) Inventor: Joseph E. Johnson, 413 S. Congress St., Winnsboro, SC (US) 29180

( * ) Notice: Subject to any disclaimer, the term of this patent is extended or adjusted under 35 U.S.C. 154(b) by 272 days.

(21) Appl. No.: 09/873,768

(22) Filed: Jun. 4, 2001

(65) Prior Publication Data

US 2002/0019975 A1    Feb. 14, 2002

Related U.S. Application Data

(60) Provisional application No. 60/209,132, filed on Jun. 2, 2000.

(51) Int. Cl.
  *G06F 9/45* (2006.01)
(52) U.S. Cl. ..................................................... 706/52
(58) Field of Classification Search .................. 706/52, 706/47
  See application file for complete search history.

(56) References Cited

U.S. PATENT DOCUMENTS

| 5,208,898 A | * | 5/1993 | Funabashi et al. ............ 706/45 |
| 5,796,917 A | * | 8/1998 | Matranga et al. .............. 706/4 |
| 6,360,212 B1 | * | 3/2002 | Linzenkirchner et al. ...... 706/4 |

* cited by examiner

*Primary Examiner*—John Chavis
(74) *Attorney, Agent, or Firm*—Nelson Mullins Riley & Scarborough LLP

(57) ABSTRACT

New techniques are disclosed for manipulating information to preserve certainty in the initial variables. Numbers themselves may be presented in a way that indicates their degree of certainty (and information content), and these numbers are processed so that the certainty and information content of the result is also known. Further calculations devoid of sufficient certainty can be terminated while others having greater information can continue. The invention may be implemented in any appropriate computing machine, such as a digital computer.

6 Claims, 2 Drawing Sheets

LOGIC WITH OPERATIONAL UNCERTAINTY

LOGIC WITH WEIGHTED VALUES

MATHEMATICS WITH NUMERICAL UNCERTAINTY

PROGRAM WHEN ALL THREADS ARE COMPUTED

APPARATUS AND METHOD FOR HANDLING LOGICAL AND NUMERICAL UNCERTAINTY UTILIZING NOVEL UNDERLYING PRECEPTS

This application claims the benefit of copending provisional application Ser. No. 60/209,132, filed Jun. 2, 2000, which is relied on herein and incorporated herein by reference.

BACKGROUND OF THE INVENTION

The present invention relates generally to data processing systems. More particularly, the present invention relates to data processing systems for performing logical operations based on fuzzy information.

Throughout history, mathematics evolved through increasingly rich systems of numbers, beginning with the positive integers. Later extensions added the concept of zero, then negative integers, ratios of integers (the rationals), the irrational numbers, the addition of infinity, and finally the complex number system.

In 1865, for example, Boltzmann provided the first full explanation and mathematical analysis of the available energy in a closed physical system with the definition of entropy, a measure of the disorder of a physical system. For the last 140 years the disciplines of statistical mechanics and thermodynamics have advanced these concepts in the areas of physics, chemistry, and engineering.

In 1948, Shannon wrote the fundamental paper on the science of information theory with definitions of the information content ("negative entropy") of a string of symbols, and additional definitions of the concepts of information redundancy and transmission loss. These foundational concepts on entropy and information were founded in part upon the previous work of Boltzmann and specifically upon the fact that highly organized energy in a physical system, and highly organized structures of symbols in an information system, are very improbable states. As time evolves, if a system is allowed to visit all physical or information states equally, then the systems will spend time in states in proportion to the probability of that state existing. Thus energy that is concentrated in a small region or in just a few particles becomes evenly dispersed over the whole system and unavailable for useful purposes. Likewise the order of strings of symbols becomes randomized and thus contains less and less information. In order for the entropy (or information) of two systems to be additive, then in view of the fact that the probabilities of given states are multiplicative, they were led to the definition of both entropy and information in terms of the logarithm of the probability of a states occupation.

In 1905, Markov developed a theory of discrete matrix transformations that transform a vector in a way that preserves the sum of the components (as opposed to the sum of the squares or other invariant form). This is valuable because it is applicable to a vector of probabilities (such as the probabilities that an object might be in any one of 12 locations) and thus where the sum of these values must give a total of 1 (certainty) to be somewhere. Likewise the Markov theory is applicable to the study of a fixed total number of entities where a Markov transformation shifts the number of objects in each category but leaves the total number of objects invariant.

In 1985, the present inventor extended the foundation of Markov's work to a theory of continuous transformations (a Markov-Type Lie Group and generating Algebra) by showing that the set of all continuous linear transformations (the General Linear Group in n dimensions) can be decomposed into Markov-type transformations and another set of continuous transformations that simply multiply each variable by a scale factor thus providing growth or diminution of the associated values. A particular transformation was found to give diffusion of a system and thus to increase entropy (and equivalently reduce information content) thereby relating increasing entropy to evolution under a group of transformations.

In approximately 1202, Fibonacci studied the prediction of populations of rabbits using a mathematical model in which he proposed that each pair of rabbits would reproduce a new pair every unit of time (except the first unit of time while they are maturing) and with the assumption that no rabbits die. Beginning with one pair of rabbits at t=1, then one has a 1 pair again at t=2, then 2 pair (the older pair and their offspring). The sequence is: 1,1,2,3,5,8,13, where $n(t)=n(t-1)+n(t-2)$. This sequence has come to be known as the Fibonacci sequence. During the $18^{th}$ and $19^{th}$ centuries, the Fibonacci number sequence was observed to occur in nature in pinecones, sunflowers and other living systems leading to unresolved conjectures as to why this sequence appears in living things.

At the same time, it was noticed that the ratio of two adjacent Fibonacci numbers approached a limit, 1.618 . . . , called the Golden Mean that appeared in architecture, the human form, and frequently in art. It was even suggested that the Golden Mean was a number third in importance only to e and to Pi. The present inventor was able to show that the Fibonacci sequence could be written as a combination of elements in the Markov Lie Group and certain scaling transformations in a particular ratio. He found a function that interpolated the Fibonacci sequence (much like the gamma function interpolates the discrete values of the factorial). Associated differential equations for this function were found and it was shown that the Fibonacci sequence, associated continuous function, differential equations, and Lie Group generating transformations were all a part of an infinite sequence of similar types of numerical sequences and functions of which the Fibonacci sequence was the "simplest."

Specifically, the Lie Algebra generating the Fibonacci sequence was found to be a specific combination of diffusion (entropy increasing/information decreasing) transformations and growth (scaling of the coordinates). An argument was presented that the Fibonacci sequence was the simplest possible transformation, on a two state system, for which diffusion of information was exactly countered by growth in such a way that allowed a simple system to retain information by growth in order to counter increasing entropy. But a proper mathematical framework for the definition of information in such a system was not available at the time.

Principia Mathematica was written in three volumes from 1910 to 1913 by Russell and Whitehead laying out the foundations of mathematics upon a rigorous foundation of logic. In particular, propositional calculus lays out a theory of variables and rules for combining these variables that can take on the binary values of true or false with operations including "negation," "and," "or," "implies," and "equivalence." Such a framework is needed in order to formalize the meaning of language and statements in the areas known as Predicate Calculus and Syllogistic Logic and Set Theory thereby laying the foundations for both Mathematics and Logic that began with the work of Boole in the 1820s. The elements in these theories are variables that are combined using tables to determine the result of the combination of two values by any of the applicable binary operations (or the unary operation of negation acting on one value). These variables only have the values of T and F (or 1 and 0).

The last 50 years has seen a complete paradigm shift under the developments issuing from VonNeuman's invention in 1945 of the stored program computer and the ensuing evolution of machines that rapidly manipulate symbols along with the symbolic structures and the computer software languages and structures to support these advances. Foundational to these advances are the combinations of the symbols "1" and "0" (termed a bit of information). Of special interest are the new advances in quantum computing where one might think of particle spin (up or down such as an electron) as representing the bit values "1" and "0". In spite of the fact that all scientific measurements have limited accuracy and inherent numerical uncertainty, computers still execute sequential decision paths with exact numerical values.

"Information" is currently understood at the "intermediate level" as unique strings of characters, specifically, with character "bytes" represented as eight binary 1/0 bits and thus information is expressed in the most basic form as ordered strings of 1's and 0's. The number of bits (1/0) provides the measure of information content as based upon the Shannon theory. However, the "higher levels" of information theory, such as how to measure the information content of a sentence, equation, industrial process, work of art (book, art, and music), has proven to be relatively intractable.

The common thread in the works just listed is that they all address the measurement, representation, and management of information either under the conditions of exact knowledge or under conditions of numerical uncertainty. Work over the last 50 years in "fuzzy logic" has not pursued the paths outlined in this application because the condition of mathematical distributivity among certain logical operations is not valid and thus alternative directions have been pursued by mathematicians in the area known as "fuzzy mathematics". U.S. Pat. No. 5,924,085, incorporated herein by reference, shows a device operating according to "fuzzy logic" principles.

SUMMARY OF THE INVENTION

Although the concept of numerical error in different forms, associated with numbers, has common usage on one level, the present invention introduces a new extension to the number system as well as to the supporting logic for a novel system for the management of logical, numerical, and computational systems with uncertainty. The invention serves to:

(i) Extend and define the concept of a binary bit number (1/0 or T/F) to a probability bit vector (bittor) allowing for a continuous range of probabilities of truth.

(ii) Extend and define the concept of propositional calculus of AND, NOT, OR, Equivalence, Implication, etc. to a new algebraic structure (a bittor algebra).

(iii) Extend the concept of binary numbers with bittor components to a new type of bittor number that replaces traditional strings of binary bits with bittors, thus forming strings of bittors which reduce to binary numbers under certain conditions.

(iv) Extend and define new concepts for the foundation of the associated bittor number arithmetic (add, subtract, multiply, and divide).

(v) Extend the concept and formal definition of information to the sub-bit level in a totally innovative way.

(vi) Extend the formalism of algorithmic structures for computers to a multithreaded computation that executes all alternatives at each branch point as a result of the fact that almost all decisions will now have a probability for validity of either branch, and furthermore tracks the spawning of these new computational threads and their associated probability and closure.

(vii) Extend and define the uses of all of these structures to real world applications as embodied in computational machines of any type (whether they be mechanical, electrical, optical, or mixtures of these with other physical, chemical, and biological embodiments) that are designed from the structures disclosed herein. This invention utilizes novel mathematical concepts involving the representations of numbers, along with the decision, operational, and arithmetic methods using these numbers with particular emphasis on all embodiments in computational devices.

Other objects, features and aspects of the present invention are provided by various combinations and subcombinations of the disclosed elements, as well as methods of practicing same, which are discussed in greater detail below.

BRIEF DESCRIPTION OF THE DRAWINGS

A fill and enabling disclosure of the present invention, including the best mode thereof, to one of ordinary skill in the art, is set forth more particularly in the remainder of the specification, including reference to the accompanying figures, in which.

DETAILED DESCRIPTION OF PREFERRED EMBODIMENTS

Figure 1:
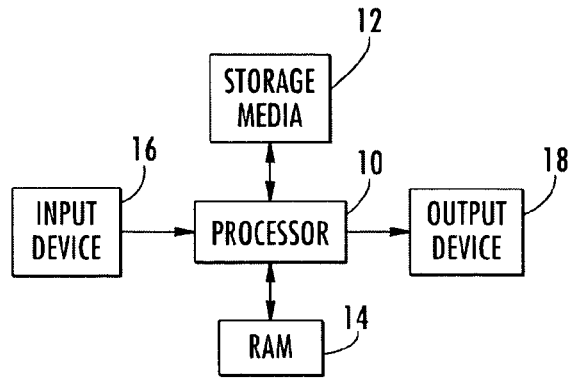
FIG. 1 is a diagrammatic representation of a computer system which may be program to utilize the various teachings of the present invention.
Figure 2:
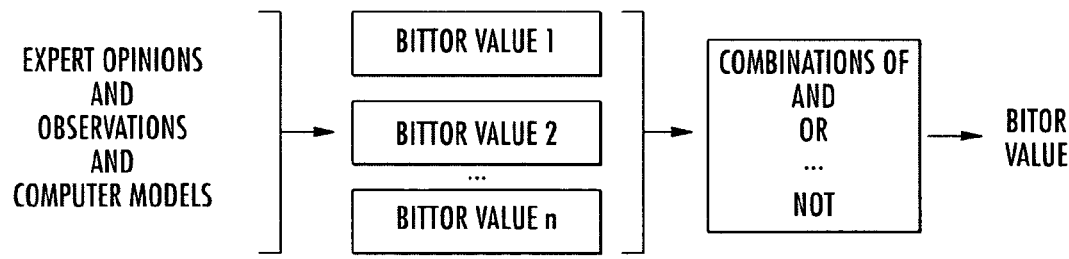
FIGS. 2–5 represent functional components of the present invention which may be utilized in various combinations in the computer system of FIG. 1.
Figure 3:
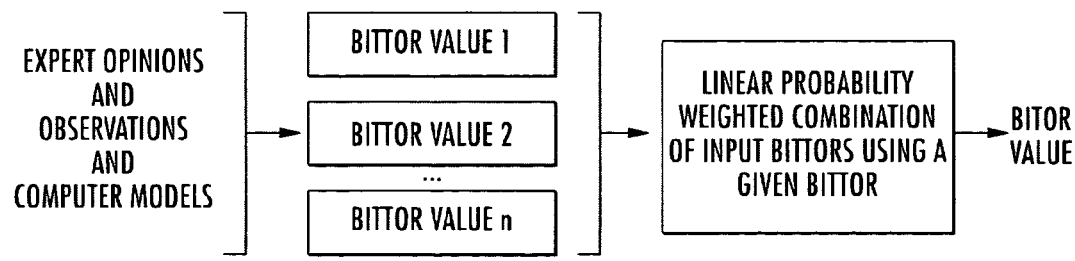

It is to be understood by one skilled in the art that the present invention is a description of exemplary embodiments only, and is not intended as limiting the broader aspects of the present invention, which broader aspects are embodied in the exemplary apparatus and methods.

In accordance with the present invention, the fundamental unit of information will be represented as a two-dimensional object similar to a "vector" where the first component represents the probability of a "one (1)" or "truth (T)" and the second value the probability of being "zero (0)" or "false (F)." The mathematical structure will not be that of a linear vector space (because not all linear combinations of components are allowed as required for a linear vector space) but a totally new kind of algebra including a unary "NOT" operation, and a binary product operation that includes "AND", "OR" and all other 16 operations of propositional calculus. This mathematical structure also includes "linear combination" operations similar to those used to build a linear vector space but these new operations do not generate non-selfconsistant values. This new mathematical structure will support a full propositional calculus, definitions of information (and entropy) on the "sub-bit" scale, and can serve as a representation space for the appropriate parts of the Markov-type Lie group. This allows a dynamic study of diffusion of information, and thus of entropy in a natural way.

With this new definition of information, new concepts can be formalized, extending the number system and its associated logic and arithmetic operations. The proposed equations can be of substantial value in optimal information retention for quantum or classical computing systems. Using this new formalism for the definition of information, a large spectrum of other very important problems can be addressed, such as: (1) The complete representation of logical and mathematical uncertainty along with the associated operations and their uncertainties. (2) The complete algorithm for the management of the computational implementation of all logic and mathematics incorporating uncertainty. (3) The optimal compression (as well as storage, transmission, and operations) of information (such as images and sound) using a new methodology that only utilizes bits of information that are needed to encapsulate and represent real information. (4) The development of the theory of mathematics and computation that optimizes the retention of information in all computational processes as well as the theory of measurement, numerical uncertainty of observational values and the algorithmic structures of such objects. (5) The equations for the measurement of information within this new mathematical system including the economics (cost/benefit analysis) of information and information retention; and the combination of information from diverse sources, the cost of those sources and the value of the combined information.

In summary, this invention lays a complete foundation for mathematical uncertainty for both logical and numerical systems with uncertainty and the complete mathematics for the execution of all expressions and the computation of associated information content. This invention will point to new theoretical directions as a generalization of current mathematical structures and will provide the exact and complete computational infrastructure rules for the deployment of calculations involving logical and numerical uncertainties in computer systems in a totally novel way.

A. Definition of a New Probability Algebra

In accordance with the present invention, the fundamental unit of information is to be represented as a pair of values $(x_1, x_0)$ where $x_1$ is the probability for "one" or "truth" and $x_0$ is the probability to be "0" or "false" with the requirement that both $x_1$ and $x_0$ be non-negative real numbers with the constraint $x_1+x_0=1$. The pair $(x_1, x_0)$, or equivalently $x_i$ (i=1,0), represent a bit-vector, which may be referred to as a "bittor" for short. A bittor is not an element of a linear vector space, but is actually a two dimensional space with a single constraint that admissible pairs of values be constrained to be on the straight line, $x_1+x_0=1$, in the positive quadrant. This makes the system effectively one-dimensional but the value of this representation will be later apparent with application of Markov and related transformations. This formalism is an extension of the simple one-dimensional values of true-false of propositional calculus or a one-zero "bit" of information, because it allows a continuous probability of truth from 0 to 1 (certainty). It is a continuous valued logic.

Almost all of the mathematical structures expressing the laws of nature for both classical and quantum physics rest upon the notion of the linear vector space. Linear vector spaces are used in classical mechanics to represent the positions and motions of all particles in three-dimensional space or in relativity, events in space-time. Likewise the states of physical systems are represented in quantum theory as vectors in an infinite dimensional Hilbert space, which is also a linear vector space. Even a Lie Algebra is a linear vector space with an additional definition of an antisymmetric product. There is an analogy of the bittor to the wave function of the spin of a quantum particle, and thus as a linear vector space (but where one uses probability amplitudes rather than probabilities).

One may, therefore, want to endow these bittors with the mathematical infrastructure of a linear vector space. However, these components represent probabilities, and probabilities combine naturally by multiplication and not additively or in linear combinations as would follow from a linear vector space structure. The problem is that when all linear combinations $a_1x+a_2y$ where $a_1$ and $a_2$ are real numbers and x and y are bittors, then the result is not a bittor and so one does not get closure. However, there is a way to generalize this concept by making $a_1$ and $a_2$ the components of a bittor. The interpretation is that the bittors x and y are "weighted" with the probabilities $a_1$ and $a_2$ themselves to be in those states. In fact one can view a two dimensional bittor itself as the linear combination $x=x_1(1/0)+x_0(0/1)$ where $x_1$ is the "weighting" for truth or "1" and where $x_0$ is the weighting for false or "0".

It is now apparent that we can define a "linear bittor space" as the linear combinations: $z=a_1x+a_2y+a_3w+\ldots+a_4v$ (Equation 0) where x,y,w,v etc are all n-dimensional bittors (i.e., n components that are non-negative reals which sum to 1 and where $a_1, a_2, \ldots$ are the components of a bittor in the appropriate dimensionality whose components have the interpretation that the associated bittor is "weighted" by the amount $a_1$). The two-dimensional bittor is at this point simply an ordered pair of non-negative real numbers whose sum is 1. It should be noted that these bittors will play the role of the simple variables in propositional calculus that previously had only the binary values of 1 and 0 or equivalently of True (T) and False (F).

It is now appropriate to define products of bittors that support the mathematical infrastructure of the propositional calculus operations (NOT, AND, OR, etc.). The notion of binary operations between the (bit) variables of propositional calculus must be extended to the bittors proposed above in analogy with the truth tables of standard propositional calculus. It is therefore necessary to have binary operations between bittors that produce a new bittor (closure) with the correct mathematics for the combinations of probability. A product of bittors should give a new bittor as $z_i=c_{ijk}x_j y_k$ with a sum over repeated indices where $c_{ijk}$ is a 2 by 2 by 2 array of numbers appropriate to the operation defined. In reviewing the operation in propositional calculus, one finds that in the traditional system, all operations can be built upon the unary operation of negation ("NOT") and the binary operation of "AND," but a more extensive definition is required for our continuous valued logic.

The negation (or "NOT") unary operation simply inverts the components $x_1=y_0$ and $x_0=y_1$ (Equation 1) as represented by the matrix (0,1/1,0) with normal matrix multiplication. The "AND" operator is defined in propositional calculus as being true when both x and y are true (i.e. are 1) and zero otherwise. The generalization of this to bittor systems is to define "AND" to be the bittor with $z_1$ (the probability of the product to be true) as the probability that both x and y are true and thus $z_1=x_1*y_1$ and to define false otherwise thus $z_0=x_1*y_0+x_0*y_1+x_0*y_0$. This combination defines the eight values of the 2*2*2 $c_{ijk}$ tensor that defines the "AND" operation.

If x and y are bittors, then it follows both that $x_1y_1+x_1y_0+x_0y_1+x_0y_0=1$ and that each of the sixteen (16) partitions of these four terms into two objects will lead to a different bittor structure and thereby define the 16 possible operations of the extended "truth tables" for the bittor products. These products can be naturally divided into three irreducible classes as shown below. Specifically, the two components of the bittor that result from the associated operations are defined (and respectively denoted as Equations 2.1 to 2.16) for z=x operation y as follows:

Class I $x$ AND $y=(x_1y_1, x_1y_0+x_0y_1+x_0y_0)$ $x$ AND (NOT $y$)$=(x_1y_0, x_1y_1+x_0y_1+x_0y_0)=$NOT($x$ IMP $y$)

(NOT $x$) AND $y=(x_0y_1, x_1y_1+x_1y_0++x_0y_0)$ (NOT $x$) AND (NOT $y$)$=(x_0y_0, x_1y_1+x_1y_0+x_0y_1)=x$ NOR $y$

NOT($x$ AND $y$)$=(x_1y_0+x_0y_1+x_0y_0, x_1y_1)=x$ NAND $y$

NOT($x$ AND (NOT $y$))$=(x_1y_1+x_0y_1+x_0y_0, x_1y_0)=x$ IMP $y$

NOT((NOT $x$) AND $y$) $(x_1y_1+x_1y_0+x_0y_0, x_0y_1)$

NOT((NOT $x$) AND (NOT $y$))$=(x_1y_1+x_1y_0+x_0y_1, x_0y_0)$ $=x$ OR $y$

Class II $x$ EQV $y=(x_1y_1+x_0y_0, x_1y_0+x_0y_1)=$NOT($x$ XOR $y$)

NOT($x$ EQV $y$)$=(x_1y_0+x_0y_1, x_1y_1+x_0y_0)=x$ XOR $y$ $x$ EQVA $y=(x_1y_1+x_1y_0, x_0y_1+x_0y_0)$

NOT($x$ EQVA $y$)$=(x_0y_1, +x_0y_0, x_1y_1+x_1y_0)$ $x$ EQVB $y=(x_1y_1+x_0y_1, x_1y_0+x_0y_0)$

NOT($x$ EQVB $y$)$=(x_1y_0+x_0y_0, x_1y_1+x_0y_1)$

Class III $x$ TRU $y=(x_1y_1+x_1y_0+x_0y_1+x_0y_0, 0)=(1,0)=$True $x$ FAL $y=(0, x_1y_1+x_1y_0+x_0y_1+x_0y_0)=(0,1)=$False Traditional alternative names have been listed to the right. One sees an interesting analogy between the $c_{ijk}$ symbol and the $C_{ijk}$ structure constants of a Lie Algebra as both define a product on the underlying bittor or vector space, but the $c_{ijk}$ defined here have various symmetry properties in j and k whereas the structure constants of a Lie Algebra are always antisymmetric. In the traditional theory, one could take the unary "NOT" operation and the binary "AND" operation as fundamental and define all other propositional operations in terms of these, but in the new theory of the present invention a separate definition is required for each of the 16 logical products as given above. We define this structure as a "Bittor Algebra." It consists of the bittor objects along with the unary operation "NOT" and the 16 operations as defined by $c_{ijk}$ symbols as well as linear combinations of bittors with coefficients that are themselves bittors forming the linear bittor space.

The "NOT" operation has an inverse which is itself. There is a unit element (1,0) (i.e. True or "1") that when combined with "AND" operator and $(x_1,x_0)$ returns $(x_1,x_0)$ and thus serves as a unit element with the AND product. Because there are 16 distinct products as listed above, there are 16 distinct $c_{ijk}$ symbols which we can distinguish by an upper superscript "t" where t=1,2, . . . 16 representing "AND" etc. One can form the sixteen different products of x with y and form a linear combination of these within the bittor vector space as $z_i=a^t c^t_{ijk} x_j y_k$ (Equation 3) where we continue to use implied summation over repeated indices and where $a^t$ is a sixteen dimensional bittor that gives the "weightings" to the other bittors. Consequently, one can form the generalized object $a^t$ c $c^t_{ijk}$ which represents all possible linear combinations of the sixteen products of propositional calculus. Within it one now has objects such as 60% AND, 30% XOR, and 10% EQV. This allows one to move continuously through the product space. Specifically, well-formed concepts can be created that are "uncertain" combinations of logical operations that can be formally used in the mathematics.

In conclusion, the present invention provides a new type of mathematical structure that consists of n-dimensional bittor objects; a linear bittor space consisting of linear combinations of bittors in dimension 'n' combined with coefficients that are components of a bittor in another dimension equal to the number of bittors; and 16bittor products, $z_i=c^t_{ijk} x_j y_k$, that generalize the traditional truth tables and exhibit a formal analogy to the concept of a Lie Algebra. Finally, it should not be forgotten that the n-dimensional bittor itself is a representation space of a Markov-type Lie group and thus maintains closure under such Markov-type transformations.

B. The Definition and Properties of the Information Function

The concept of how to define "Information" is also relevant. The traditional definition of a "bit" of information as the knowledge of a "1" or a "0" (i.e., true (1,0) or false (0,1)) value for a state and as measured by the unit of one "bit" is continued. But now one can look at partial information with probabilities. "Will it rain here tomorrow?" was previously answered by "true" or "false" but is now answered by $(x_1,x_0)$ giving the probability $x_1$ that it will rain, and $x_0$ that it will not rain. Obviously if $(x_1,x_0)$ is either (1,0) or (0,1) then we have exactly one bit of information (I=1). But if we have equal probabilities for rain and not-rain (i.e., (0.5,0.5)) then we have absolutely no information (I=0). Other vectors yield something more than 0 and less than 1 bit of information. Information must be defined as a function of a bittor that gives a real scalar number between 0 and 1 and also reduces to the values given above for (1,0), (0,1) and (0.5,0.5) given above.

Information cannot be a linear function of $x_1$ and $x_0$ because information is symmetric under the interchange of $x_1$ and $x_0$ (since we get one bit of information for either true or false) and a symmetric linear combination is proportional to $x_1+x_0$ which is a constant (1) and would give the same information for all states (including the state (½,½) which contains no information). Thus the function must be non-linear. The mapping of vectors into the reals is normally accomplished with the concept of a scalar product (which is both symmetric and non-linear (actually bi-linear) as required). If a metric is defined for this scalar product, it must be symmetric between the upper and lower values and will thus take the form (a,b/b,a). The information contained in a bittor will be a function of the scalar product of the bittor with itself. Recall that information must be represented as the log of probabilities in order that when information is added, the probabilities are multiplied.

It is proposed herein that Information be defined as log base 2 (written as $\log_2$) of the scalar product of a bittor (1,0) with itself using the metric (a,b/b,a). The product of the bittor (1,0) with itself and also (0,1) with itself must both give the value "1" bit in order to agree with the Shannon definition that perfect knowledge of a "1" or a "0" give exactly 1 bit of information. Both restrictions lead to the same equation: I=$\log_2$(a)=1 which implies a=2. Likewise requiring that the bittor (0.5,0.5) have 0 information gives the requirement I=$\log_2$(a/2+b/2)=0. But since a=2, this requires that b=0 and the information metric is thus determined to be (2,0/0,2). This definition correctly provides the correct reduction to all previous values of one bit of information for (1,0) and (0,1) and zero bits of information for the state (0.5,0.5). The assumption of the $\log_2$ of the scalar product is sufficient, along with symmetry (and the boundary conditions of the value of information to be 1 or 0 for the two cases above), to determine that the on diagonal elements have the value 2 and that the off diagonal elements have the value 0.

In summary, we define information by the equation: $I=\log_2(2*x_1\char`^2+2*x_0\char`^2)=\log_2(2*r\char`^2)$ (Equation 4.1) where r is defined by the equation: $r\char`^2=x_1\char`^2+x_0\char`^2$, (Equation 4.2), i.e., the probability that the state of the system will be found in the state as represented as opposed to finding the system in the opposite state to the one being represented.

If the state of a system is $(x_1,x_0)$ then the scalar product with (1,0) gives the probability $(x_1)$ that the observation will be true while the scalar product with (0,1) gives the probability $(x_0)$ that the system will be observed to be false. More generally, the scalar product of the bittor with itself generally gives the probability that if the state is $(x_1,x_0)$ then it will be found in the state $(x_1,x_0)$ while off diagonal terms would give the probability that if the state is true that it would be found false and conversely.

Formally, the scalar product defined above is already contained in the bittor algebraic structure as the concept of "self equivalence," thus there is no need to define a metric or scalar product at all. This product is in fact the bittor operation of equivalence (EQV) between a bittor and itself. In fact one notices that EQV is defined by the tensor structure $c_{1jk}=(1,0/0,1)$ and $c_{0jk}=(0,1/1,0)$. Thus when taken between a bittor and itself, the product is a new bittor whose upper component is the same as the metric product discussed above, while the lower component appears to be related to the probability that a bittor in one state is observed to be in the opposite state. This lower component is related to disorder or entropy. Note that the sum of these two components is, like all bittors, equal to one and thus the sum of the upper component which measures information, and the lower component, which measures entropy, is constant. Because of this result, it is unnecessary to define the metric as a new operation. In a Lie Algebra, the product is always antisymmetric and cannot serve as a metric. But in the Bittor algebra, EQV provides a symmetric bilinear form thus automatically endowing the space with a metric. Furthermore, the length of a 'vector' in this space (actually a bittor) is a direct function of its information content: x EQV $x=2\char`^(I-1)$. Just as the scalar product in a metric space is not invariant under all possible transformations, here also this bilinear product defining the information will not be invariant under all other actions on the bittor space.

Utilizing the measure of information as $I=\log_2(2*(x_1\char`^2+x_0\char`^2))$, one can address the general problem of information content of more complex systems in units of bits of information. For a system that is more complex than a simple yes/no (e.g., rain/no-rain), it is well known that the total system (with uncorrelated dimensions) is the outer product of the constituent systems. The total information content of the system is the sum of the component information units and has a maximum of n bits for an n-component system. One can also look at transformations that will leave the amount of information in the system invariant. Using the new variable $r\char`^b 2=x_1\char`^2+x_0\char`^2$ (for each part of the multi-component system), the total information, for an n-dimensional system, is $I=n+2*\log_2(r_1*r_2* \ldots *r_n)$ (Equation 5.1). Now define $r_1=2\char`^(s_i)$ and we get $I=n+2*(s_1+s_2+\ldots+s_n)$ (Equation 5.2). Thus, constant information is achieved by a Markov type Lie Group transformation on the $s_i$ space. Such transformations can be seen as a shifting, or equivalently by performing an "exchange" of information between different bit components in the n-dimensional space having components, which are the logs of the radii of the bit vectors.

Of special interest is the strong non-linearity of information loss when one leaves a maximal state ((1,0) or (0,1)). Specifically for the states (0.9,0.1), (0.8,0.2), (0.7,0.3) and (0.6,0.4), the information content is I=0.71, 0.44, 0.21, and 0.06 respectively. Thus the information content of knowing that that the probability of rain on each of four days at 70% is 4×0.21=0.84 which is less than the information of knowing that it will definitely rain on one day with no knowledge of the other three days.

It was not understood that energy was conserved until the concept of disorganized energy in the form of heat was understood. Then it was realized that energy, although conserved, passed from a "useful" form of kinetic or potential energy into heat in a manner that was not completely reversible leading to the gradual increase of entropy. The two bittor components of x EQV x with values $(x_1\char`^2+x_0\char`^2, 2x_1x_0)$ sum to the value 1 as do all bittors. The first of these components is equal to ½ $2\char`^I$. The second term is a measure of "lack of information" which leads us to define the concept 'Oformation' (O implying zero information or no information) by the equation $O=\log_2 2 (2x_1x_0+\frac{1}{2})$ (Equation 6) which leads to the value range of O=0 for a bittor with perfect information (I=1) and O=1 for a state of no information (I=0). The sum of bittor values (based upon the conservation of probability) then leads to the 'conservation law' $2^I+2^O=3$ (Equation 7). It is necessary to coin a new word here as the terms 'chaos', 'entropy', 'disorder', 'misinformation' all have existing meanings that would be confusing.

One can consider the function $<I>=p_i \log2 p_i$ which is often used to calculate the expectation value of the entropy or equivalently the information. This formula arises from statistical considerations and has a form, which is similar to the proposed definition of information and meets the required boundary conditions. But this formula is obtained by taking the information as defined by Shannon ($\log_2$ p which is correct for a specific state) and computing, for an ensemble that occupied all possible states, the expected value of the entropy. To obtain this expectation value, one multiplies the probability of a given state times the information for that state thus giving p $\log_2$ p. One specifically notes that this equation, as a definition of information, is not additive as it is equivalent to $\log_2$ p^p. The definition proposed herein by the inventor is an additive definition of information.

C. Definition of a Bittor Number

One traditionally builds the binary real numbers from sequences of 1s and 0s that represent the presence or absence of that power of 2 for that position in the uncorrelated binary string. Thus 101.1 means $1*2\char`^2+0*2\char`^1+1*2\char`^0+1*2\char`^-1$. The concept of a binary number suggests that the 1s and 0s are the upper components of a bittor that is exact. Thus we now define a generalized concept of number called the "bittor number" that consists of a linear string of uncorrelated two-dimensional bittors at each position previously occupied by a 1 or a 0 in a binary number. For example, a bittor number is defined as an ordered string (i.e. a list in one dimension) of bittors (possibly containing a decimal point) for example: (1/0) (1/0) (0/1). (1/0) (0/1) (0.81/0.19) (0.4/0.6) (0.5/0.5). Such numbers can be abbreviated by the upper components only to retrieve the standard binary numbers if no bittor components are fractional i.e. 110.10 from the first part of the string.

The operational methodology that is here deployed to create such a number is to use a unit of measure (e.g., meter) that is marked at the points $4, 2, 1, 0, \frac{1}{2}, \frac{1}{4}, \frac{1}{8}, \ldots$ i.e. at $2^{\wedge}(n)$. Then measure a given length by testing if $2^{\wedge}n$ meters can be fit within it. If so, then subtract exactly that length and write a "1" at the nth binary position. Otherwise write a "0" at that position and continue (without subtracting). This operation is then continued for lower and lower powers, iteratively, for each successively small power of 2. At some point, one cannot easily judge whether the next value will fit. One then estimates the probability that it will fit the next lower power, etc, until a point is reached where we have equal probability (i.e. no information) as to whether the next unit will fit or not. This leads to a sequence of bittors as listed at the beginning of this paragraph.

It is important to realize that the concept of a bittor number contains previous concepts of number including (binary) integers, rationals, and reals. It is also of great importance to realize that the inventor here defines bittor numbers operationally (i.e. by real world operations and measurements) as opposed to a formal definition of number that is used in traditional mathematics. It is also important to realize that the inventor hereby defines the bittor number as the representation space of outer product of Markov-type Lie groups. Thus a bittor number is the representation space of the outer product of n independent Markov Lie groups.

D. Arithmetic Operations Defined between Bittor Numbers

The arithmetic operations +−*/ (add, subtract, multiply & divide) can be defined on the binary portions of two numbers as is traditionally defined: For addition, 1+0=1; 0+1=1; 0+0=0; and 1+1=10, where the last operation carried a '1' into the next power of 2 for addition there as is required. Likewise for the other operations as they are traditionally defined. Here, these operations are extended to indefinite bittor components with the rule that all operations are performed with bittor components as with binary operations but with components that consist not of values but of the probability of those values. For example, x+y is defined as $$(x_1/x_0)+(y_1/y_0)=[(x_1{}^*y_1)/(x_1{}^*y_0+x_0{}^*y_1+x_0{}^*y_0)]$$
$$[(x_0{}^*y_1+x_1{}^*y_0)/(x_1{}^*y_1+x_0{}^*y_0)]$$

(Equation 8). The first bittor on the right side of the equation represents the probability to carry a '1' (or not carry a '1' for the lower component) to the next power of 2. The second bittor defines the value of the addition at that power of 2.

To subtract, take $[(1/0)(x_1/x_0)]-[y_1/y_0]= [(x_1{}^*y_1+x_0{}^*y_1+x_1{}^*y_0)/(x_0{}^*y_1)][(x_1{}^*y_0+x_0{}^*y_1)/(x_0{}^*y_0+x_1{}^*y_1)]$ (Equation 9) where $x_0{}^*y_1$ in the first bittor on the right hand side of the equation represents the probability that it was necessary to 'borrow' in order to execute the subtraction. Note that the primary (right most) new bit position for both addition and subtraction (i.e., the second bittor and not the first or 'borrow' bittor), is the XOR operation. The carry bittor for add is AND while for subtract the carry position is (NOT x) AND y.

For the multiply definition we define 1*1=1 and 1*0=0*1=0*0 without any form of carry or borrow at this level. Thus, bittor multiplication is defined as $(x_1/x_0)^*(y_1/y_0)=[(x_1{}^*y_1/(x_1{}^*y_0+x_0{}^*y_1+x_0{}^*y_0)]$ (Equation 10), which is the AND operation exactly. The normal iterative process of multiplying two binary numbers is thus invoked here with the extensions shown above for bittor multiplication. Division can be defined and executed as multiplication by an inverse value (or in the case of uncertain numerical values where there is no inverse, the closest value to an inverse in the sense of information loss).

Having formally defined the sum and product of two bittors, one now proceeds to define the operation for an entire bittor number to be the result of the normal process of adding or multiplying the associated bittor components as is done with traditional arithmetic. What is very new here is that error propagates forward carrying uncertainty in the bittor values. Different orders of combination can give different results. This is similar to friction in mechanical systems in that to drag an object from one location to another is path dependent and longer paths create more disorder and heat. The same problem obtains here as can be seen from the simple fact that the adding of an uncertain bittor to a number and then its subtraction do not lead back to the original number as an additional error has been introduced. This raises an issue that has no traditional analogue because the result of the calculation is now dependent upon the order and method of calculation. The result of any calculation may therefore be defined as the one with the minimum loss of information.

E. Computational Implementations

Traditional computer programming rests upon the ability of the program to make comparisons based upon mathematical and propositional calculus, which result in unambiguous true and false consequences. Statements such as If x>y Then . . . Else . . . or structures based upon DO and While structures are commonplace examples. But if the Boolean logic is based upon bittors, one only computes the probability for true or false. Likewise if numerical error is present in numerical values (as it might be with bittor strings) then the test of If x>y would result in a certain probability for truth and for false. Although one can arbitrarily take the branch with the greatest probability (effectively "quantizing the system"), the resulting computation does not result in the full answer, only the most probable. When systems are complex and convoluted, it is of the greatest importance that computational algorithms pursue all reasonable paths with appropriate weights to incomplete and partial information and then to finally collect and integrate the multiple outcomes into distributions of results that reasonably represent the best possible determination.

As all decision trees can be reduced to binary trees, the decision paths can be accurately labeled as a binary tree with a 1 for every branch that was true and 0 for the alternative branch (adjoined to the existing path string). Thus any computational path can be represented and thus tracked by a binary number. The probability of any given path can be computed by the means above and carried with the path. Thus one core aspect of the current invention is upon the use of the bittor algebra, associated bittor propositional calculus, bittor numbers, and bittor arithmetic, that when such systems are implemented in computers, that every branch be followed and tracked with its associated probability. This means that for every decision point (with non-negligible probabilities for both outcomes) that a new thread (or process) will be spawned with an associated probability and be tracked with the associated binary number.

As such a system would quickly explode with the number of concurrent processes, it is likewise crucial that threads or processes are terminated automatically when their associated probability falls below a selected threshold. A second method here proposed for thread termination is that the increase in information is less than the user established as a threshold, or in a more automatic methodology, when the process offers no useful information to the values and processes being computed as based upon the definitions of information that are implemented. Finally, the most sophisticated method is to perform the cutoff if the information gained per cost (in computation use) or per time unit falls below a threshold. It is well within the current computational capability of computer systems to spawn the processes proposed here, track them along with their associated probabilities, and terminate noncontributing threads. An example of such a process is the computation of a function such as an exponential of a value, that is only known to 2 significant digits. It is obvious that the subsequent loops determining higher and higher order corrections in the $7^{th}$ and $8^{th}$ significant digits add no information and would be terminated under the design of the invention proposed here. Likewise the introduction of partial and probabilistic information (judgments in medical, social, economic, and military environments) can be automatically incorporated in the current structures invented here.

F. Formal Exposition

1. Bittor Object: We define a "Bittor" $(x_1,x_0)$ as an ordered pair (or in n dimensions, an ordered set or n-tuple) of real, nonnegative numbers that satisfy the constraint $x_1+x_0=1$ (or generally in n dimensions the sum of all components=1). Thus $0<=x_1<=1$. Note that these objects are like a vector in the sense that they are an ordered pair (or n-tuple) of numbers but they are not part of linear vector space. Since numerical uncertainty as represented by these upper and lower components is itself an inexact value, one can approximate the values as binary rationals with accuracy reflected in the number of digits with an implied denominator of the form and appropriate length, for example, 1000 reflecting the denominator with the correct accuracy. Thus the bittor value (0101) is to be used as a compression methodology and is thus taken to mean (0101/1000, 0011/1000) with the level of accuracy indicated. They are representations of the Markov-Type Lie Group.

2. Interpretation: The normal interpretation for two dimensions is that $x_1$ is the probability for an event to be True "T," or a system to have the value "1" (one) and $x_0$ is the probability for an event to be False "F," or a system to have the value "0" (zero). This is in contrast to the traditional bit values of "1"=(1,0) and "0"=(0,1) which have certain probability to be 1 or 0. For higher dimensions, they can, for example, be interpreted as probabilities for cell occupancy.

3. Unary NOT Operation Defined (previous Equation 1): The Unary NOT operation is defined as the matrix operator (0,1/1,0) acting on a bittor. Thus, Not $(x_1,x_0)=(x_0,x_1)$ (Equation 1) and thus NOT reverses the positions of the two components of a bittor. NOT is its own inverse and NOT NOT=1.

4. The sixteen (16) binary operations (t=1,2, . . . 16) are defined as previously listed by these explicit equations, z=x op y (Equations 2.1 to 2.16). The $c^t_{ijk}$ as defined here constitute a 2*2*2 cube of numbers (with values of 1 or 0) that belong to the class of objects that satisfy $c^t_{1jk}+c^t_{0jk}=1$ for all j & k i.e. (1,1/1,1). This results in the fact that $z_1+z_0=1$ and $z_i$ is non-negative. Likewise we define the generalized binary product $a^t c^t_{ijk}$ where $a^t$ is a sixteen dimensional bittor (see previous Equation 3). This object allows any uncertain or weighted combination of binary operations and still results in a valid bittor as the result of the weighted combinations taken among the bittors.

5. Linear Bittor Space Defined: A linear bittor space is defined as a linear combination of n-dimensional bittor objects using coefficients which are themselves the components of a single bittor whose dimension is equal to the number of bittors being combined as shown above (previous Equation 0). The interpretation here is that one set of bittors is "weighted" with the components of the "coefficient bittor." The result of this operation is always a valid bittor and this structure is the bittor generalization of the concept of a linear vector space.

6. Bittor Algebra Defined: The set of objects called bittors along with the unary operation NOT and the 16 binary products as defined above, and extended by combinations of bittors in the linear bittor space described above, constitute a new type of mathematics that can serve as the foundation of Logic or a Propositional Calculus. This system is called a "Bittor Algebra." It resembles the concept of Lie Algebra, which is a linear vector space with a similar product also defined. The value of this "bittor algebra" mathematics is to represent incomplete information in the spectrum between 1 bit and 0 bits of information. As such, it can serve as the foundation of logical operations for computation both in mathematics and for computer decision structures using the binary AND, NOT, OR, and derivative operations on fractional information. In the following it will serve to support definitions of information content and to support the foundational operations of mathematics +−*/(add, subtract, multiply & divide) as defined on the binary number system.

A significant aspect of this invention of the Bittor Algebra and associated structures and functionality and derivative mathematical operations is the embodiment of this structure into any form of mechanical, electrical, optical, biological, or other computational machine or device for the management and representation of uncertain information and values.

7. Information Defined: The information content of a bittor object is defined as that given by the equation: $I=\log_2\{2*\{x_1^2+x_0^2\}\}$ (previous Equation 4) as a novel definition of information on the "sub-bit" level. Here $\log_2$ means the log base 2 and the symbol ^ takes a value to a power thus 3^5 is 3 to the power 5. The argument for this function is the upper component of the self-equivalency of a bittor with itself thus: $(x_1,x_0)EQV(x_1,x_0)=x_1^2+x_0^2$ which is=2^(I−1) for the upper component. The lower component of the resulting bittor can be associated with a lack of information and which we define to be the "Oformation" as defined in previous Equation 6 and leading to the conservation law in Equation 7. Another significant aspect of the present invention involves the use of these equations defining improved concepts for information and Oformation when embodied in any mechanical, electrical, and optical or other computational machine or device.

8. Numbers Defined as Uncorrelated Ordered Strings of Bittors: An extension of the real (binary) number system as a "bittor number" is defined as an uncorrelated ordered string of (two dimensional) bittors, for each power of 2, that represents the probability that each value obtains in the operation (i.e. result of the operational action of determining if that power of two obtains). This system reduces to the traditional binary real number system when all bittor values are exactly known and otherwise generalizes the current number system. Specifically we include here the representation of a bittor not only as a pair of real numbers as qualified above, but the approximation of this pair by a pair (or a single value as their sum must be the value 1) of binary numbers of given length that represents the level of accuracy known. Specifically the upper component of a bittor would be represented by 0101 with the understanding that the sum of the two components would be 1000 and thus the lower component would be 0011. With this convention, a number might be represented by the sequence 1011.1(011) where the last bittor stands for the pair of binary ratios: (011/100, 001/100). A further aspect of this invention involves the use of these new types of bittor numbers as an extension of the concept of binary numbers and thus to all existing number systems including all representations, storage, mathematical processing, transmission in any embodiment in any mechanical electrical, optical or other machine or automated method or automation. By uncorrelated bittor strings we mean that there is no correlation between the value of a bittor at one position with any other position. But a natural extension, to those skilled in this art, is to include the concept of correlated bittor strings which in effect become tree structures in some cases where if a bittor component is upper then the subsequent measurement of error is one bittor but if the bittor component is lower, then one obtains a different bittor thus correlating the values of the bittor in the second position with that in the first position. The present invention covers correlated structures of bittors as they are necessary in certain areas.

9. Arithmetic Operations defined on the Bittor Numbers: Addition and Multiplication are defined (as per the equations 8, 9, and 10) specified above for a pair of bittors. For a bittor number, the operation proceeds as customary with each pair of bittors being combined by the equations for addition and multiplication defined above. When different orders of combinations yield different results, the result with the minimum information loss is to be taken as the optimal and correct answer by the invention set forth here.

10. Computational Component of this Invention: Although all existing processes in logic and mathematics obtain exactly as before with exact numbers and thus programming methodology is appropriately unchanged, when information is uncertain either in the form of logic values (as bittors that are not 1 or 0 exactly), or in the form of logical operations (such as AND, OR etc), or in the form of numerical values (bittor numbers), or any combination of informational uncertainty as represented above; then any computer program in any language or structure will be presented with a probability for truth and for false both of which is to be pursued as follows: A '1' is to be added to the current path string if the branch is for "true" is chosen and a '0' otherwise (thus creating two new path strings) and these new path strings are to be kept as variables (in addition to all other current state values) along with the associated probability of validity of each of the two paths. The "upper path" is taken as the branch and a new process (or thread) is spawned in the program for the "lower branch." Threads are terminated when (a) the probability of a process or thread is lower than a selected value, (b) when the information content is not measurably improved by the previous iteration (as in a loop that is sustained for a calculation), or (c) when the information per cost or per time unit is lower than a specified amount (or any combination of these). Final results for logical and numerical values, $a_i$, are the probability weighted combinations of values from all processes or threads ($p_i a_i$) while string and other values are presented with the associated values of probability as the final result. It is important to collect all contributing threads for the determination of any value that is used in subsequent calculations before the associated process is invoked. The present invention provides for the automatic computation and adjustment of error and uncertainty in logical and mathematical processes. The multiple simultaneous paths that are tracked and weighed with applicable probability are reminiscent of Feynman paths in quantum theory but rather in an information space. This process, and its embodiment in any computational device in software or hardware implementations, whether electrical, mechanical, optical, biological, or by other means including quantum computational methods are aspects of this invention along with all results from the other parts of this invention based upon the aspects above associated with bittors, bittor logic, bittor numbers, and bittor algebra.

G. Utility and Implementations of this Invention

The vast proportion of both logical and numerical information that exists, involves an inherent uncertainty. This uncertainty might be in the form of a prediction for rain or the outcome of a surgical procedure (which we would represent as a two component bittor). This uncertainty might also be in a logical process as the result of a legal penalty such as 80% chance that the penalty will be one year in jail AND a fine of $50,000, and a 20% chance that the penalty will be one OR the other (which we would represent as a bittor weighted combination of the two $c'_{ijk}$ operations for AND and OR). This uncertainty might also be in the form of a numerical measurement such as the length of an object or its mass or its coefficient of linear expansion, and thus is to be represented by a bittor number. It is a fact that essentially all of scientific, engineering, business, and generally all real world values have a limited accuracy and thus an associated uncertainty. This invention explicitly provides the entire and exact means for the management of logical and numerical uncertainty in determining the result of the combination of values and operations. This invention is thus to cover the embodiment of the equations, interpretations for use, and procedures for deployment as described herein for computational devices whether they be in a form that is mechanical, electrical, optical, biological, or otherwise. Other explicit examples of systems that will be better managed with the inventions disclosed herein are as follows:

1. Scientific and Engineering Computations: Essentially all scientific values have an inherent uncertainty. For example the computation of the Bessel function of a value of 3.2 should not continue to loop through an iterative procedure when the resulting series calculation only alters digits that are well beyond two significant figures of the argument value. Thus all loops for the calculation of functions will proceed as long as they contribute useful information and will otherwise automatically terminate. This process leads to a vast improvement in speed of the computation at no loss to accuracy or to better accuracy as opposed to the current process of executing n iterations. Specifically, all tables and databases of values of densities, elasticity, conductivities, modulus of materials, tensile strengths, and the uncertainties associated also with the ambient temperatures, humidity, inherent mixture of impurities, and other factors make essentially all real world information uncertain. The automatic management of logical and numeral uncertainty by our invention, through computer processes as delineated here, will vastly improve construction of buildings and structures such as bridges. The definition of information will furthermore allow a whole new field of the cost of acquiring new scientific information in order to make comparative studies and investments.

As a specific example, as components are assembled, given the spectrum of sizes and the temperature and humidity of the assembly environment, what is the probability that the $13^{th}$ component (e.g. a bolt) will not fit the assembled pieces? What is the expected overall width of the object after assembly? The present invention allows the automatic management of the associated uncertain numerical values. Also the consequential uncertain logic that mistakes of type G and F are both made or that mistake L is made on the same assembly item. Here the exact management of every bit and operational aspect of uncertainty is automatically and exactly managed by the bittor algebra within a computer system tracking the assembly.

2. Medical and Legal Decisions: Based upon past experience with surgical and medical treatments or with drugs, experience will dictate the probabilities for various outcomes based both upon discrete decisions such as whether to perform a given surgical procedure, and also based upon continuous values such as the dosage of various drugs. It may also involve mixtures of procedures that are best represented by AND and OR. All of these uncertainties cannot be currently programmed in linear sequential computer systems that follow a single thread and which admit only exact logical values, operations and numbers. Thus, this invention provides an entire paradigm shift and innovative leap for more accurate representation of information, opinion, and outcome. A vast portion of the input is also uncertain information arising from the diverse opinions of physicians and attorneys on so many of the pertinent areas and thus their knowledge can only be represented and encapsulated with bittor structures and the associated logic.

A specific example is that of entering the following information into a computer system: If medical procedure A is performed while the patient is taking drug G then the probability that the procedure will be successful will be x but if they are not taking the drug then either the patient will develop condition H with probability y unless they immediately start taking drug L and the patient will then only have a probability of z that the procedure is successful. Each conditional outcome, procedure, and drug has a different cost. Conversely, if medical procedure A is performed while the patient is not taking drug G then an alternative set of probabilities are obtained. A patient wants to know the expected cost and possible cost range with the probability of each. Such structures can be easily encoded in the bittor logic and values and associated computer programs.

3. Business and Financial Decisions & Social Science Systems: Although one thinks of financial values as exact (in the sense of dollar values), the associated value actually has a relative uncertainty if one considers the value of investments in real estate, stocks, bonds, and any item dependent upon futures, or foreign currency. Thus all associated calculations are likewise uncertain that depend upon such values such as expected rate of return on these investments and so the associated value is also uncertain. Most values in the social sciences are equally uncertain, populations are never known exactly, the vehicle density on a road, opinion polls for various topics, and even the number of actual votes for the president as was demonstrated in the recent presidential election. Business statistics on everything from agricultural production by crop to auto sales and the consumer price index has various degrees of associated uncertainty that can be processed by the methodology delineated herein.

4. Human Sensory Interfaces and Engineering Specifications: Not only do all scientific values have an associated uncertainty, the requirements for human perceptions well as engineering design have accuracy limitations. Specifically for human senses, there are well known limits on visual (color, resolution, and intensity) levels, aural (frequency, loudness, timing, and harmonic) levels and other sensory levels beyond which humans cannot perceive differences. Thus no new information (from the human viewpoint) is added by systems which exceed these levels, and costs can be saved by appropriate storage, transmission processing, and presentation at the correct perception level. From the engineering specifications level, one need not invoke needless accuracy in the production on size, weight, strength, and all other design parameters beyond the required specifications for the final product. These same specifications apply to medical, geological, pharmaceutical, and all scientific and engineering production specifications. The mathematical and computational structure specified design that is claimed in this application then enable not only meaningful input requirements and measurements and processing requirements, but also by this claim, utilize final output specifications for production processes enabling vast time and cost savings for all industrial business and information processes. production processes enabling vast time and cost savings for all industrial business and information processes.

5. Conclusions and General Usage: The revolutionary nature of this system is that it correctly calculates and tracks the extremely complex uncertainties, errors and information content for all information management processes. A true paradigm shift is associated with this totally new mathematics for the entire system defined by the linear bittor space, associated bittor mathematics, information content generalization, and multithreaded computational system that is claimed as the substance of this invention. This invention provides the collection of methods, in both equations, interpretations, and procedures that, when embodied in a computational system, will allow the automatic management of logical and numerical uncertainty and which will provide a revolutionary leap in the sophistication with which computer systems can more accurately mimic both the processes of judgment of the human mind and the universe which it endeavors to describe.

H. Discussion of Drawings

FIG. 1 illustrates a computer system in which various aspects of the present invention may be implemented. In this case, the computer system has a processor 10 in operative communication with a storage media 12 and a RAM 14. An input device 16 provides information to processor 10, while information is supplied to a user or for further processing at output device 18.

Figure 4:
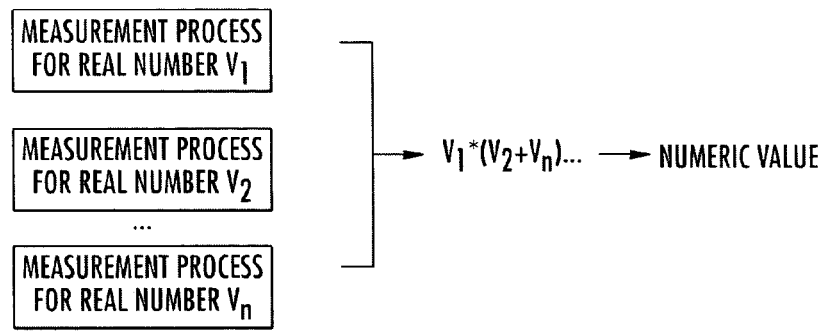
Figure 5:
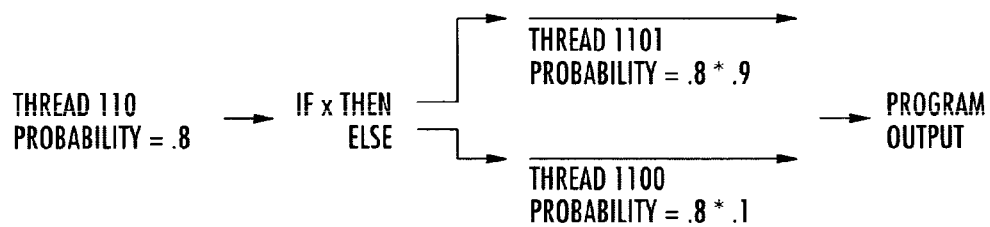

FIGS. 2–5 show various functional components of the present invention that may be utilized in the computer system of FIG. 1. Specifically, FIGS. 2 and 3 respectively illustrate logic with operational uncertainty and logic with weighted values in accordance with the present invention, both of which are described in great detail above. FIG. 4 illustrates mathematics using bittor numbers as described in detail above. Finally, FIG. 5 illustrates the process of "spawning a new thread" in a computational process being performed in a computer as is also discussed above in great detail. It will be appreciated that the present invention includes apparatus and computer-implemented methods for practicing any of these techniques, as well as others discussed above. The present invention is also intended to cover any sequence of machine-executable instructions for doing same, when stored on disk or any other tangible media.

While preferred embodiments of the present invention have been shown and described, modifications and variations may be made thereto by those of ordinary skill in the art without departing from the spirit and scope of the present invention, which is more particularly set forth in the appended claims. In addition, it should be understood that aspects of the various embodiments or method steps may be interchanged both in whole or in part. Furthermore, those of ordinary skill in the art will appreciate that the foregoing is by way of example only, and is not intended to be limitative of the invention so further described in such appended claims.

What is claimed is:

1. A data processing apparatus comprising:
   a processor;
   an input device for supplying input information to be processed, said input information including probability bittors indicating uncertainty of correctness;
   a storage media containing rules for manipulating said input information to yield output information, said rules being capable of processing said bittors; and
   an output device for receiving said output information from said processor.

2. A data processing apparatus as set forth in claim 1, wherein said probability bittors contain an order collection of numbers indicating truth and falsity, respectively.

3. A data processing apparatus as set forth in claim 2, wherein said rules for manipulating include logical operations.

4. A data processing apparatus as set forth in claim 3, wherein said logical operations function according to the equation $z_i = c^t_{ijk} x_j y_k$, where $z_i$ is a bittor resulting from application of logical operation $c^t_{ijk}$ on bittors $x_j$ and $y_k$.

5. A data processing apparatus as set forth in claim 2, wherein said rules for manipulating include arithmetic operations.

6. A data processing apparatus as set forth in claim 1, wherein said processor is operative to pursue computational threads of greater and lesser probability in calculating said output information, a particular thread being terminated when its probability falls below a predetermined threshold.

* * * * *